3,272,774
POLY(ARYLESTER-AMIDES) DERIVED FROM (1) DIPHENOLS, (2) DIAMINES, AND (3) POLYBASIC ACIDS
Wendell W. Moyer, Jr., Parkersburg, W. Va., assignor to Borg-Warner Corporation, Chicago, Ill., a corporation of Illinois
No Drawing. Filed Jan. 2, 1962, Ser. No. 163,902
1 Claim. (Cl. 260—47)

This invention relates to linear condensation polymers and in particular to the poly(arylester-amides) of polybasic acids represented by the formula

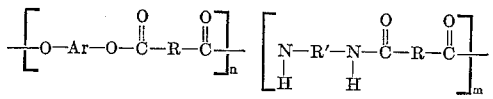

in which Ar is aryl or alkaryl, R and R' are alkyl, aryl or a single bond.

The two main classes of condensation polymers are the polyesters and the polyamides. The polyesters are condensation products of one or more glycols or diphenols with one or more dicarboxylic acids. The polyamides of commercial importance are condensation products of dicarboxylic acids with primary diamines.

The polyamides, which are typified by the nylon type polymers, have many desirable physical characteristics making them useful for many applications including fibers, film and shaped articles. Outstanding among these are their high melting points and exceptional strength characteristics. In general these polymers possess these outstanding physical properties both because of the nature of the amide linkage and the highly ordered, crystalline state of the polymers.

The broad class of polyesters may be subdivided into two groups; those based on glycols, and those based on diphenols.

The polyesters based on glycols can possess high melting points and good strength characteristics; but in general only when the polymers have a highly crystalline macro-order. Polymers of this group are typified by poly(ethylene terphthalate). This polyester is highly crystalline in nature which gives it the high melting property but which also causes it to be highly insoluble and very difficult to dye.

The polyesters based on diphenols have only fairly recently been studied at any length (A. Conix, Ind. Chim. Belge, 22, 1457 (1957); Belgian Patent 563,173). Unlike the polyesters based on glycols, this group of polymers can be prepared by "interfacial" techniques in addition to the usual melt condensation methods (although certain special procedures must be employed in the melt condensations). The polyesters of this group in general are high melting even when completely non crystalline, are soluble in common solvents, have greatly reduced tendencies to crystallize and have desirable strength characteristics. However, the solvent and stress crack resistance is frequently poor. When crystalline, these polyesters suffer from the same difficulties as the glycol based crystalline polyesters.

Both the polyamides and the polyesters, therefore, possess certain advantages and certain disadvantages. Many attempts have been made to combine them in the same polymers and thereby achieve the many desirable properties of the two. The polyesters employed in all of these "polyester-amides" to date have been glycol based. By combining these two units in the same molecule the tendencies to crystallize have been greatly reduced. The melting points of the mixed polymers, consequently, are generally very low. As a result, these polyester-amides known heretofore have not approached the parent polymers in utility. In one case, however, poly(esteramides) of this class with high melting points and, therefore, increased potential utility have been prepared, but the procedure is complex (Patent 2,925,405, Laakso and Williams).

It is accordingly an object of the present invention to chemically combine the highly polymeric linear polyesters based on diphenols with polyamides and thereby obtain poly(arylester-amides) with hybridized properties, depending upon the relative amount and mode of incorporation of the ester and amide units, of those of the parent polymers without sacrificing the major desirable properties of both of these polymer types.

This and other objects are attainable by the condensation of dihydric phenols and primary diamines with polybasic acids. The "interfacial" reaction of a primary diamine and a diphenol in aqueous alkaline solution with a diacid chloride of a dicarboxylic acid is perhaps the simplest and most direct method. However, other techniques such as melt polycondensation also are feasible.

In these new polymeric systems the diphenols and diamines may be used in varying proportions in reaction with the dicarboxylic acid. Consequently, the composition of these new poly(arylester-amides) within the scope of this invention would range from diphenol-diamine molar ratios of approximately 95/5 to 5/95. And the ratio of bonding units, ester/amide, would vary in the same manner.

Diphenols which are useful in the practice of this invention include bisphenols of which the following are representative:

2,2-bis-(4-hydroxyphenyl)-propane(Bisphenol-A);
bis-(2-hydroxyphenyl)-methane;
bis-4-hydroxyphenyl)-methane;
1,1-bis-(4-hydroxyphenyl)-ethane;
1,2-bis-(4-hydroxyphenyl)-ethane;
1,1-bis-(2-chloro-4-hydroxyphenyl)-ethane;
1,1-bis-(2,5-dimethyl-4-hydroxyphenyl-ethane;
2,2-bis-(3-phenyl-4-hydroxyphenyl)-propane;
2,2-bis-(4-hydroxynaphthyl)-propane;
2,2-bis-(4-hydroxyphenyl)-pentane;
2,2-bis-(4-hydroxyphenyl)-hexane;
bis-(4-hydroxyphenyl)-phenylmethane;
bis-(4-hydroxyphenyl)-cyclohexylmethane;
1,2-bis-(4-hydroxyphenyl)-1,2-bis-(phenyl)-ethane;
2,2-bis-(4-hydroxyphenyl)-1-phenylopropane;
bis-(4-hydroxy-5-nitrophenyl)-methane;
bis-(4-hydroxy-2,6-dimethyl-3-methoxyphenyl)-methane;
2,2-bis-(2,6-dichloro-4-hydroxyphenyl)-propane;
2,2-bis-(2-bromo-4-hydroxyphenyl)-propane.

The preparation of these and other applicable bisphenols is known in the art. They are most commonly prepared by condensation of two moles of a phenol with a single mole of a ketone or aldehyde.

Also useful are dihydroxybenzenes typified by hydroquinone and resorcinol: dihydroxybiphenyls such as 4,4'-dihydroxybiphenyl; 2,2'-dihydroxybiphenyl; 2,4'-dihydroxybiphenyl; and dihydroxynaphthalenes such as 2,6-dihydroxynaphthalene, etc.

Dihydroxyaryl sulfones are also useful such as bis-(4-hydroxyphenyl)-sulfone; 2,4'-dihydroxyphenyl sulfone; 2,4'-dihydroxy-5'-chlorophenyl sulfone; 3'-chloro-4,4'-dihydroxyphenyl sulfone; bis - (4-hydroxyphenyl)-biphenyl disulfone, etc. The preparation of these and other useful dihydroxyarylsulfones is described in Patent 2,288,282, Huissmann. Polysulfones, as well as sulfones substituted with halogen, nitro, alkyl and other substituents are also useful. In addition, related sulfides and sulfoxides are applicable.

Dihydroxyaromatic ethers are useful and may be prepared by methods found in Patent 2,739,171, Linn, and in "Chemical Reviews," 38, 414–417 (1946). Typical of such dihydroxyaryl ethers are the following:

4,4'-dihydroxyphenyl ether;
4,4'-dihydroxy-2,6-dimethylphenyl ether;
4,4'-dihydroxy-3,3'-diisobutylphenyl ether;
4,4'-dihydroxy-3,3'-diisopropylphenyl ether;
4,4'-dihydroxy-2,2'-dinitrophenyl ether;
4,4'-dihydroxy-3,3'-dichlorophenyl ether;
4,4'-dihydroxynaphthyl ether;
2,4'-dihydroxytetraphenyl ether;
4,4'-dihydroxytriphenyl ether;
4,4'-dihydroxy-2,6-dimethoxyphenyl ether, etc. The many other types of suitable dihydroxyaryl compounds will be apparent to those skilled in the art.

The primary diamines which are useful in the preparation of the present polymers are any amines which are normally used in the preparation of polyamides. Examples of such diamines are 1,6-hexanediamine, 1,2-propanediamine, and p-phenylenediamine. Examples of other primary diamines suitable for use in the present invention can be found in Patents 2,071,250; 2,071,254 and 2,130,948 relating to the preparation of linear polyamides.

The polybasic acids used in preparing the present polymers are the carboxylic acids used in the preparation of the linear polyamides by reacting a diamine with the acid. Examples of these polybasic acids are found in Patents 2,071,250; 2,071,254 and 2,130,948, and may be typified by polybasic acids such as phthalic, sebacic, isophthalic and fumaric.

The following examples are illustrative of the preparation of poly(arylester-amides) of dicarboxylic acids.

EXAMPLE 1

*Condensation production of phthalic acid (tere/iso- 50/50) with Bisphenol-A (90 mole percent) and hexamethylenediamine (10 mole percent)*

To a one liter Mortin flask, fitted with a stirrer, two dropping funnels, thermometer and water-cooled condenser, were charged 255 g. distilled water, 56 g. (0.25 mole) Bisphenol-A, 0.06 g. sodium bisulfite, 1.0 g. benzyltrimethylammonium chloride, 22.0 g. (0.55 mole) sodium hydroxide and 0.25 g. p-phenylphenol.

With rapid stirring, 27.9 g. (0.14 mole) terephthaloyl chloride and 27.9 g. (0.14 mole) isophthaloyl chloride dissolved in 265 g. methylene chloride was added drop-by-drop to the water solution over approximately sixty minutes' time. Simultaneously, 3.2 g. (0.03 mole) 1,6-hexanediamine dissolved in 100 ml. water was added drop-by-drop. The temperature of the reaction was held at 25° C.±2° C. during the reaction by means of an ice/water bath.

After all the acid chloride and amine had been added, stirring was continued for one hour. The water layer was separated and removed.

The polymer solution was washed with distilled water, 10% hydrochloric acid, and then with distilled water until neutral and free of salt. The polymer was coagulated in isopropanol, filtered and dried. The resulting product was white and stringy in appearance, and was capable of being molded and cast into tough, clear films. It had an inherent viscosity of 0.59 at 25° C. in dichloromethane. The yield was 77% of theory. The softening temperature was 228°–236° C.

The polymer had the following physical properties:

| Property: | Molded pieces (Inherent viscosity, 0.49) |
|---|---|
| Izod impact, ft. lb./in. | 1.4 |
| Tensile strength, p.s.i. | 7500–10,900 |
| Elongation, percent | 10 |
| Melt index,[1] at 475° F. | 0.1A3 |

[1] A modification of the procedure set forth in A.S.T.M. Method D–1238–52T. This procedure was originally developed for determining the melt index of polyethylene. Broadly and briefly, in this method, the weight in grams of polyethylene that is discharged during a period of three minutes through a standard orifice positioned below a reservoir of the polymer that is at a standard temperature and under a standard pressure is determined. This determination is proportioned to give the grams of polymer discharged during ten minutes which figure is, by definition, the melt index of polyethylene.

Since the thermoplasticity of the blends with which this invention is concerned is not even of the same order of magnitude as that of polyethylene, a considerable modification of the standard conditions and dimensions set forth in A.S.T.M. Method D–1238 had to be made in order to make this general method applicable to the blends with which this invention is concerned. These modifications involved changes in the size of the orifice, the pressure applied to the plastic in the reservoir, the reservoir temperature, and the like.

As used herein, melt indexes express the weight in grams of polymer blend discharged in one minute through an orifice 0.125 inch in diameter and 0.315 inch long from a reservoir 0.373 inch in diameter containing polymer maintained at a temperature of 450° F. and under a pressure produced by a load A of 5664 g. or a load B of 2775 g. Thus, a melt index of .5A3, for example, means that .5 g. of polymer were discharged through the orifice in three minutes under the conditions named and under a pressure produced by a load of 5664 g. Similarly, a melt index of 1.3B3, means that 1.3 g. of polymer was discharged through the orifice in three minutes under the named conditions and under a pressure produced by a load of 2775 g.

EXAMPLE 2

*Condensation product of phthalic acid (tere/iso- 50/50) with Bisphenol-A (90 mole percent) and 1,2-propanediamine (10 mole percent)*

To a two liter Morton flask, fitted with a stirrer, two dropping funnels, thermometer, and water-cooled condenser, were charged 510 g. distilled water. 112.4 g. (0.5 mole) Bisphenol-A, 0.11 g. sodium bisulfite, 2.0 g. benzyltrimethylammonium chloride, 48.4 g. (1.21 moles) sodium hydroxide.

With rapid stirring, 55.8 g. (0.28 mole) terephthaloyl chloride and 55.8 g. (0.28 mole) isophthaloyl chloride dissolved in 530 g. dichloromethane was added drop-by-drop to the water solution over forty-five minutes. Simultaneously, 4.5 g. (0.06 mole, 90% pure) 1,2-propanediamine dissolved in 100 ml. water was added drop-by-drop. The temperature in the reaction vessel was held at 25°±2° C. during the addition by means of an ice/water bath.

After all the acid chloride and amine had been added, stirring was continued for one hour. The water layer was separated and removed. The polymer solution was washed with distilled water, 10% hydrochloric acid, 10% acetic acid, and then with distilled water until neutral and free of salt. The polymer was coagulated in isopropanol, filtered and dried. The resulting product was white and coarse in appearance. It had an inherent viscosity of 0.97 at 25° C. in dichloromethane. The yield was 95.2% of theory. The softening temperature was 231–241° C.

Molded pieces are light colored, tough and hard. Films cast from dilute solution were clear, flexible, and tough.

The polymer had the following physical properties.

Property: Molded pieces (Inherent viscosity, 0.69)
  Izod impact _____ ft. lb./in__   4.8
  Tensile strength _____p.s.i__ 9100–10,300
  Elongation _____percent__   15

EXAMPLE 3

*Condensation product of phthalic acid (tere/iso- 50/50) with Bisphenol-A (75 mole percent), 1,2-propanediamine (25 mole percent)*

This reaction was run as Example 2, using 93.6 g. (0.41 mole) Bisphenol-A, and 11.3 g. (0.14 mole) 1,2-propanediamine.

The resulting product had an inherent viscosity of 0.72 at 25° C. in dichloromethane and a softening point 247°–252° C., yield 160.1 g. (91.2%).

The polymer could be molded and cast into film. The infra-red spectrum of solution cast film was in agreement with the suggested composition.

EXAMPLE 4

*Condensation product of phthalic acid (tere/iso- 50/50) with Bisphenol-A (90 mole percent) and ethylenediamine (10 mole percent)*

To a one liter Morton flask were charged and mixed at 15° C. 255 g. water, 22.0 g. (0.55 mole) sodium hydroxide, 56.4 g. (0.25 mole) Bisphenol-A, 0.06 g. sodium bisulfite, 1.0 g. benzyltrimethyl-ammonium chloride and 65 g. dichloromethane. With rapid stirring, to this mixture were charged 1.7 g. (0.03 mole) ethylenediamine dissolved in 50 g. water and, simultaneously, 55.8 g. (0.28 mole) phthaloyl chloride (tere/iso- 50/50) in 200 ml. dichloromethane. Stirring was continued for twenty minutes, and then the water layer was removed. The polymer was washed with 10% hydrochloric acid and with water until neutral and free of salt, coagulated and dried to a white granular solid.

Inherent viscosity: 0.68 at 25° C. in m-cresol.
Yield: 81.8 g., 85.9%.
Soft temp. 236–248° C.

EXAMPLE 5

*Condensation product of phthalic acid (tere/iso- 50/50) with Bisphenol-A (75 mole percent) and ethylenediamine (25 mole percent)*

To a large home blender were charged and mixed 680 g. water, 17.4 g. (0.44 mole) sodium hydroxide, 34.2 g. (0.15 mole) Bisphenol-A, 0.1 g. sodium bisulfite, 3.0 g. (0.05 mole) ethylenediamine, 1.0 g. benzyltrimethyl-ammonium chloride and 100 ml. dichloromethane. To the ice cooled mixture was charged a solution of 40.6 g. (0.2 mole) phthaloylchloride (tere/iso-50/50) dissolved in 100 ml. dichloromethane over approximately 10 minutes. The reaction mixture was stirred further for 12 minutes and the water was decanted. The polymer was washed with hydrochloric acid and water until neutral and free of salt, coagulated and dried to a white granular solid.

Inherent viscosity: 0.98 at 25° C. in m-cresol.
Yield: 47.0 g., 74.4%.
Soft temp.: 257–265° C.

EXAMPLE 6

*Condensation product of phthalic acid (tere/iso- 50/50) with Bisphenol-A (40 mole percent) and ethylenediamine (60 mole percent)*

This reaction was run the same as Example 5 except 22.8 g. (0.1 mole) Bisphenol-A and 6.0 g. (0.1 mole) ethylenediamine were charged.

The final polymer analyzed by infrared to be a 60/40-amide/ester copolymer.

Inherent viscosity: 0.70 at 25° C. in m-cresol.
Yield: 38.4 g., 86.2%.
Soft temp. 226–241° C.

EXAMPLE 7

*Condensation product of phthalic acid (tere/iso- 50/50) with hexamethylenediamine (90 mole percent) and Bisphenol-A (10 mole percent)*

To a home blender were charged 170 g. water, 4 g. (0.1 mole) sodium hydroxide, 5.2 g. (0.045 mole) hexamethylenediamine 1.14 g. (0.005 mole) Bisphenol-A, 25 ml. dichloromethane and a small amount of crushed ice.

To this rapidly stirred mixture was added over a period of four minutes, 10.15 g. (0.05 mole) phthaloyl chloride (tere/iso- 50/50) dissolved in 225 ml. dichloromethane.

Following the addition, stirring was continued for twenty minutes, at which time the temperature in the reaction mixture was 40° C.

The polymer was filtered and washed alternately with water and methanol, 10% hydrochloric acid and finally with water and methanol.

The resulting polymer had an inherent viscosity of 1.28 at 25° C. in m-cresol and a softening point of 204°–212° C.; yield 12.1 g. (93.6%). The infra-red spectrum was in agreement with the suggested composition.

EXAMPLE 8

*Condensation product of phthalic acid (tere/iso- 50/50) with hexamethylenediamine (80 mole percent) and Bisphenol-A (20 mole percent)*

This reaction was run as in Example 7, using 4.4 g. (0.04 mole) hexamethylenediamine and 2.9 g. (0.01 mole) Bisphenol-A. The acid chloride solution was added over twenty minutes.

The resulting polymer had an inherent viscosity of 0.92 at 25° C. in m-cresol and a softening point of 206°–214° C.; yield 12.0 g. (82.9%).

The infra-red spectrum of the polymer indicated an 80% amide and 20% ester copolymer.

EXAMPLE 9

*Condensation product of phthalic acid (tere/iso- 50/50) with hexamethylenediamine (50 mole percent) and Bisphenol-A (50 mole percent)*

This reaction was run as in Example 7, using 2.4 g. (0.025 mole) hexamethylenediamine, 5.7 g. (0.025 mole) Bisphenol-A and 0.2 g. benzyltrimethylammonium chloride. The acid chloride solution was charged over a period of 30 minutes.

The resulting polymer had an inherent viscosity of 0.81 at 25° C. in dichloromethane and a softening point of 212°–221° C.; yield 14.2 g. (93.4%). The infra-red spectrum of the polymer was in agreement with the suggested composition.

EXAMPLE 10

*Condensation product of phthalic acid (tere/iso- 50/50) with hexamethylenediamine (90 mole percent) and Bisphenol-A (10 mole percent)*

This reaction shows that poly(phenylester-amides) can be prepared by the unstirred interfacial technique.

To a beaker were charged 20 g. water, 0.88 g. (0.022 mole) sodium hydroxide, 1.14 g. (0.01 mole) hexamethylenediamine, and 0.27 g. (0.001 mole) Bisphenol-A.

A solution of 2.24 g. (0.011 mole) phthaloyl chloride (tere/iso- 50/50) dissolved in 20 ml. benzene was carefully placed on top of the water layer in the beaker.

A film formed at the interface of the benzene and water. By grasping the film at the center with a pair of tweezers, a "rope" of polymer was pulled away from the interface.

The infra-red spectrum of a sample of the polymer indicated 90% amide and 10% ester copolymer.

EXAMPLE 11

*Condensation product of sebacic acid with hexamethylenediamine (60 mole percent) and Bisphenol-A (40 mole percent)*

To an ice jacketed small home blender were charged 4.56 g. (0.02 mole) Bisphenol-A, 2.32 g. (0.02 mole) hexamethylenediamine, 0.25 g. triethylamine, 3.40 g. (0.085 mole) sodium hydroxide and 100 ml. of ice water. With rapid stirring and cooling a solution of 9.56 g. (0.04 mole) sebacyl chloride dissolved in 200 ml. of methylene chloride was added over a ten-minute period. The temperature of the contents of the flask at this point was 10° C. The ice jacket was removed and stirring continued for an additional seven minutes at which time the temperature inside the flask was 28° C. The product was quenched by pouring into 800 ml. of a 1:1 methanol-water solution containing 5% hydrochloric acid. The product was isolated by filtration, washed with 5% sodium hydroxide in the blender, refiltered, washed in the filter with 5% hydrochloric acid, and then several times with water. The yield of dried, white granular polymer was 10.8 g. (80%). The product had an inherent viscosity of 0.78 in m-cresol at 25° C. and melting point of about 167° C. The infra-red spectrum is in agreement with the suggested composition.

EXAMPLE 12

*Condensation product of isophthalic acid with hexamethylenediamine (50 mole percent) and Bisphenol-A (50 mole percent)*

To a small side arm test tube equipped with a nitrogen bubble tube extending to the bottom were charged 4.56 g. (0.02 mole) Bisphenol-A, 2.32 g. (0.02 mole) hexamethylenediamine and 12.73 g. (0.04 mole) diphenyl isophthalate. While maintaining a slow flow of nitrogen through the tube, the tube was heated in a silicone oil bath from 110 to 220° C. over a 12 hour period, then from 220 to 270° C. over a 6-hour period, and finally held at 265 to 275° C. for 10 hours. During the last 5 hours of the heating period the pressure was reduced to 20 mm. Hg. The by-product phenol distilled off during the reaction, and at the end of the heating period a very viscous mass remained. The product was dissolved in m-cresol, filtered and coagulated into methanol. After drying a light tan colored resinous product was obtained. The polymer had an inherent viscosity of 0.44 at 25° C. m-cresol. The infra-red spectrum was in agreement with the proposed composition.

EXAMPLE 13

*Condensation product of phthalic acid (tere/iso- 50/50) with resorcinol (75 mole percent) and hexamethylene diamine (25 mole percent)*

To a one-liter Morton flask were charged 205 g. water, 24 g. (0.6 mole) sodium hydroxide, 22.7 g. (0.21 mole) resorcinol, 65. g. dichloromethane, 0.06 g. sodium bisulfite and 1.0 g. benzyltrimethylammonium chloride.

To the above stirred mixture was charged over 45 minutes from a dropping funnel 8.0 g. (0.07 mole) hexamethylene diamine dissolved in 50 ml. water. Simultaneously, 55.8 g. (0.28 mole) phthaloyl chloride (tere/iso- 50/50) dissolved in 200 g. dichloromethane was charged drop by drop over 65 minutes.

The resulting polymer was washed and coagulated as in previous examples.

The final polymer was a cream-colored solid with an inherent viscosity of 0.17 at 25° C. in m-cresol. The infra-red spectrum is in agreement with the suggested composition; softening point 140° C.; yield 37.2 g. (71.4%).

It can be seen from the foregoing examples that the polymers of the present invention are relatively high melting thermoplastic resins with hybridized properties of the poly(arylesters) and polyamides of which they are composed. The polymers having been found useful in molding shaped articles and in making films and fibers.

It is apparent from the foregoing examples and discussion that many widely different embodiments may be made without departing from the spirit and scope of this invention and it is to be understood that said invention is in no way limited except as set forth in the appended claim.

I claim:

A linear polymeric composition having an inherent viscosity of at least 0.17 when measured in m-cresol at 25° C., said polymer comprising in its linear chain from about 5 to about 95 mole percent recurring phenyl ester groups of the formula

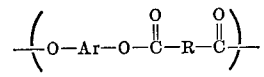

and correspondingly from about 5 percent to about 95 mole percent recurring amide groups of the formula

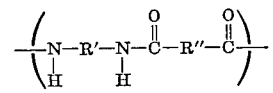

wherein R, R', and R'', are radicals selected from the group consisting of alkyl, aryl, and benzene ring carbon to benzene ring carbon bonds and Ar is a radical selected from the group consisting of aryl and alkaryl radicals.

References Cited by the Examiner

UNITED STATES PATENTS

| | | | |
|---|---|---|---|
| 2,224,037 | 12/1940 | Brubaker et al. | 260—78 |
| 2,708,617 | 5/1955 | Magat et al. | 260—47 |
| 2,901,466 | 8/1959 | Kibler et al. | 260—75 |

LEON J. BERCOVITZ, *Primary Examiner.*

JOSEPH R. LIBERMAN, *Examiner.*

J. J. KLOCKO, *Assistant Examiner.*